US007260512B2

(12) United States Patent
Mahe et al.

(10) Patent No.: US 7,260,512 B2
(45) Date of Patent: Aug. 21, 2007

(54) METHOD FOR DETERMINING THRESHOLD VALUE OF A NUCLEAR REACTOR OPERATING PARAMETER, CORRESPONDING SYSTEM, COMPUTER PROGRAMME AND SUPPORT

(75) Inventors: Patrice Mahe, Piolenc (FR); Christian Royere, Issy les Moulineaux (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/532,272

(22) PCT Filed: Oct. 13, 2003

(86) PCT No.: PCT/FR03/03016

§ 371 (c)(1),
(2), (4) Date: Oct. 11, 2005

(87) PCT Pub. No.: WO2004/038730

PCT Pub. Date: May 6, 2004

(65) Prior Publication Data

US 2006/0129362 A1    Jun. 15, 2006

(30) Foreign Application Priority Data

Oct. 21, 2002 (FR) .................................. 02 13093

(51) Int. Cl.
G06F 17/10 (2006.01)
G06G 7/48 (2006.01)

(52) U.S. Cl. ................................ 703/2; 703/6; 700/30

(58) Field of Classification Search .................... 703/2, 703/6; 376/245, 248; 73/572; 700/28, 29, 700/30, 31
See application file for complete search history.

(56) References Cited

U.S. PATENT DOCUMENTS 3,901,090 A * 8/1975 Akey et al. .................... 73/572

| 4,330,367 A | | 5/1982 | Musick |
| 4,643,866 A | * | 2/1987 | Thornton et al. ........... 376/245 |
| 5,912,933 A | | 6/1999 | Shaug et al. |
| 6,535,568 B1 | * | 3/2003 | Reese .......................... 376/245 |

FOREIGN PATENT DOCUMENTS

| EP | 405863 | 1/1991 |
| EP | 1113455 | 7/2001 |
| EP | 1221701 | 7/2002 |

OTHER PUBLICATIONS

Kim et al., K. Nuclear Power Plant Fault Diagnosis Using Neural Networks with Error Estimation by Series Association, IEEE Transactions on Nuclear Science, vol. 43, No. 4, Aug. 1996, pp. 2373-2388.*

Burton et al., A.W. Concurrent Simulation of Reactor Core Dynamics, IEEE Control Theory and Applications, vol. 140, No. 3, May 1993, pp. 205-215.*

(Continued)

*Primary Examiner*—Russell Frejd
(74) *Attorney, Agent, or Firm*—Kenyon & Kenyon LLP

(57) ABSTRACT

A method of determining a threshold value of a nuclear reactor operating parameter having the steps of simulating at least a transient operational occurrence of the nuclear reactor, calculating the value reached by a physical quantity during the transient operational occurrence in at least a cladding of a fuel rod of the reactor and establishing, as a limit value of an operational parameter of the reactor, the value of the operational parameter when the value calculated the step of calculating the value reached by a physical quantity during the transient operational occurrence which corresponds to a value of the physical quantity which characterizes a failure of the cladding.

19 Claims, 11 Drawing Sheets

OTHER PUBLICATIONS

Petersen et al., E.L. Rate Prediction for Single Event Effects, IEEE Transactions on Nuclear Science, vol. 39, No. 6, Dec. 1992, pp. 1577-1599.*

Rohde, U. The Modeling of Fuel Rod Behaviour Under RIA Conditions in the Code DYN3D, Annals of Nuclear Energy, vol. 28, No. 13, Sep. 2001, pp. 1343-1363.*

* cited by examiner

METHOD FOR DETERMINING THRESHOLD VALUE OF A NUCLEAR REACTOR OPERATING PARAMETER, CORRESPONDING SYSTEM, COMPUTER PROGRAMME AND SUPPORT

FIELD OF THE INVENTION

The present invention relates to a method for establishing at least a limit value for at least a first operational parameter of a nuclear reactor comprising a core, in which fuel assemblies are loaded, the fuel assemblies comprising fuel rods each comprising pellets of nuclear fuel and a cladding which surrounds the pellets. The invention applies, for example, to pressurized water reactors.

BACKGROUND INFORMATION

A large number of these reactors are currently used around the world. It may be advantageous, in particular in countries such as France where 80% of electricity is produced by nuclear reactors, for the total power supplied by the reactors to vary in order to be adapted to the needs of the electrical network which they supply.

In particular, it is desirable to be able to operate the reactors at reduced power for a long period of time, when demand on the network is low, before reverting to nominal power, as necessary.

Such use of each reactor, which would allow its capabilities to be better used, should not result in safety problems.

SUMMARY

An objective of the present invention is to solve this problem by providing a method which allows at least a limit value of an operational parameter of a nuclear reactor to be established, allowing the capabilities of the reactor to be better used, while maintaining safe operation of the reactor.

To this end, the present invention relates to a method for establishing at least a limit value of at least a first operational parameter of a nuclear reactor comprising a core, in which fuel assemblies are loaded, the fuel assemblies comprising fuel rods each comprising pellets of nuclear fuel and a cladding which surrounds the pellets, characterized wherein the method comprises the steps of:
  b) simulating at least a transient operational occurrence of the nuclear reactor,
  c) calculating the value reached by a physical quantity during the transient operational occurrence in at least a cladding of a fuel rod and
  d) establishing, as a limit value, the value of the first operational parameter when the value calculated in step c) corresponds to a value for the physical quantity which characterizes a failure of the cladding.

According to specific embodiments, the method may comprise one or more of the following features, taken in isolation or according to all technically possible combinations:
  it comprises, before step b), a step for:
    a) establishing a failure value for the physical quantity which characterizes a failure of the cladding,
  step a) comprises the subsidiary steps of:
    a1) subjecting fuel rods to gradients of nuclear power,
    a2) calculating the values reached by the physical quantity in at least a cladding which has failed during a power gradient,
    a3) selecting the minimum value from the values reached which are calculated in step a2),
  the failure value used in step d) is equal to the minimum value selected in step a3),
  the failure value used in step d) is equal to the minimum value selected in step a3) and corrected by a factor which represents an operating mode of the reactor,
  the method comprises, before step c), a step for:
    b') establishing at least a fuel rod whose cladding is the most stressed during the transient occurrence simulated in step b),
    and step c) is carried out for the or each rod which is established in step b'),
  step b') comprises the subsidiary steps of:
    b'1) evaluating the value reached by the physical quantity in the claddings of a plurality of fuel rods and
    b'2) selecting, as the rod whose cladding is the most stressed, the rod whose value evaluated in step b'1) is the highest,
  the first operational parameter is the power per unit length supplied by a fuel rod,
  the first operational parameter is a period of time for operation of the reactor at an intermediate power less than its nominal power,
  the limit value is a limit value for triggering an emergency shutdown of the reactor,
  the method further comprises at least a step for:
    e) establishing a limit value for triggering an alarm from the limit value for an emergency shutdown established in step d),
  step b) is carried out for at least an operating mode of the reactor selected from the group constituted by:
    an operating mode at a total power of the reactor equal to its nominal power,
    an extended operating mode at intermediate power, in which the total power of the reactor is less than its nominal power over a period of time of at least 8 hours per period of 24 hours,
    a continuous network operating mode, in which the total power varies alternately around a high power and around a low power,
    a primary control operating mode, in which the total power of the reactor varies by from 0 to 5% around a reference value in the order of between 95 and 100% of the nominal total power of the reactor,
  for at least an operating mode, the steps b) to d) are used for another operating mode with, as the failure value of the physical quantity, the failure value of that other operating mode corrected by a corrective value,
  the transient occurrence simulated in step b) is a transient occurrence selected from the group comprising:
    an excessive increase in load,
    an uncontrolled removal of at least a group of control clusters,
    one of the control clusters falling,
  the physical quantity is a stress or a function of stress(es) in the cladding and
  the physical quantity is a deformation energy density in the cladding.

The invention further relates to a system for establishing at least an operational parameter of a nuclear reactor, characterized in that the system comprises an arrangement for carrying out the steps of a method as defined above.

According to one exemplary embodiment, the method comprises at least a computer and storage means, in which at least a program for carrying out steps of the establishing method carried out by the system are stored.

The invention further relates to a computer program comprising instructions for carrying out the steps of a method as defined above.

The invention further relates to a medium which can be used in a computer and on which a program as defined above is recorded.

BRIEF DESCRIPTION OF THE DRAWINGS

The invention will be better understood from a reading of the description below which is given purely by way of example with reference to the appended drawings, in which.

DETAILED DESCRIPTION

Figure 1:
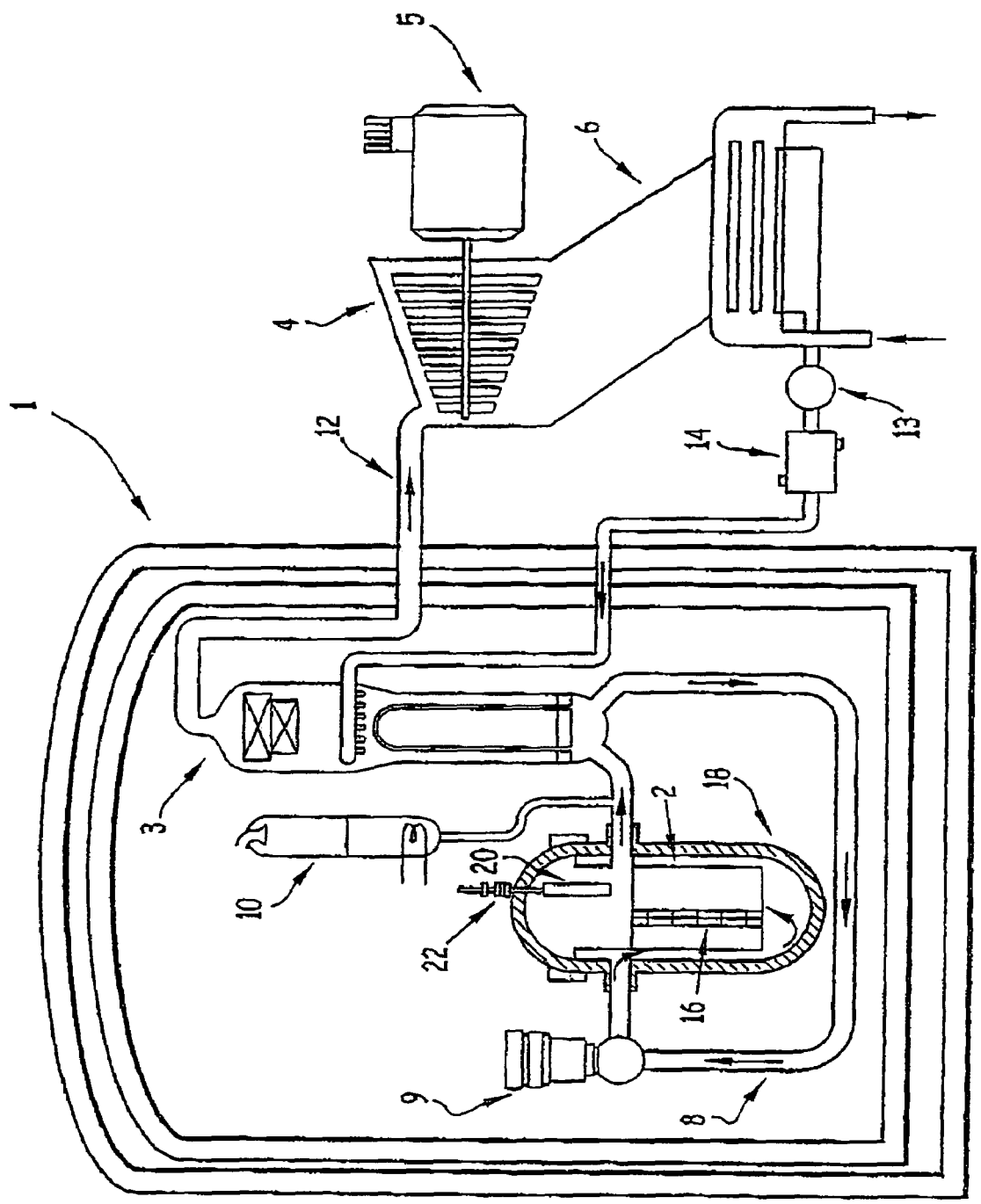
FIG. 1 is a schematic view illustrating a pressurized water nuclear reactor.

FIG. 1 schematically illustrates a pressurized water nuclear reactor 1 which conventionally comprises: a core 2, a steam generator 3, a turbine 4 which is connected to an electrical energy generator 5 and a condenser 6.

The reactor 1 comprises a primary circuit 8 which is provided with a pump 9 and in which pressurized water circulates along the path indicated by the arrows in FIG. 1. That water rises in particular through the core 2 in order to be re-heated at that point, bringing about the cooling of the core 2. The primary circuit 8 further comprises a pressurizer 10 which allows the water which circulates in the primary circuit 8 to be pressurized. The water of the primary circuit 8 also supplies the steam generator 3, where it is cooled, bringing about the evaporation of water which circulates in a secondary circuit 12.

The steam produced by the generator 3 is channelled by the secondary circuit 12 towards the turbine 4, then towards the condenser 6 where that steam is condensed by indirect heat exchange with the cooling water which circulates in the condenser 6. The secondary circuit 12 comprises a pump 13 and a re-heater 14 downstream of the condenser 6.

The core 2 also comprises fuel assemblies 16 which are loaded in a vessel 18. Only one assembly 16 is illustrated in FIG. 1, but the core 2 comprises, for example, 157 assemblies 16.

The reactor 2 comprises control clusters 20 which are arranged in the vessel 18 above some assemblies 16. Only one cluster 20 is illustrated in FIG. 1, but the core 2 may comprise, for example, approximately 60 clusters 20.

The clusters 20 can be displaced by mechanisms 22 in order to be introduced into the fuel assemblies 16, above which they are suspended. Conventionally, each control cluster 20 comprises control rods of a material which absorbs neutrons.

In this manner, the vertical displacement of each cluster 20 controls the reactivity of the reactor 1 and permits variations in the total power P supplied by the core 2 from zero power up to nominal power PN in accordance with the insertion of the clusters 20 in the fuel assemblies 16.

Some of these clusters 20 are intended to bring about control of the operation of the core 2, for example, in terms of power or temperature, and are referred to as control rod clusters. Others are intended to shut down the reactor 1 and are referred to as shutdown clusters.

The clusters 20 are combined in groups in accordance with their type and their intended purpose. For example, for 900 MWe CPY type reactors, those groups are referred to as groups G1, G2, N1, N2, R, SA, SB, SC, SD . . .

Figure 2:
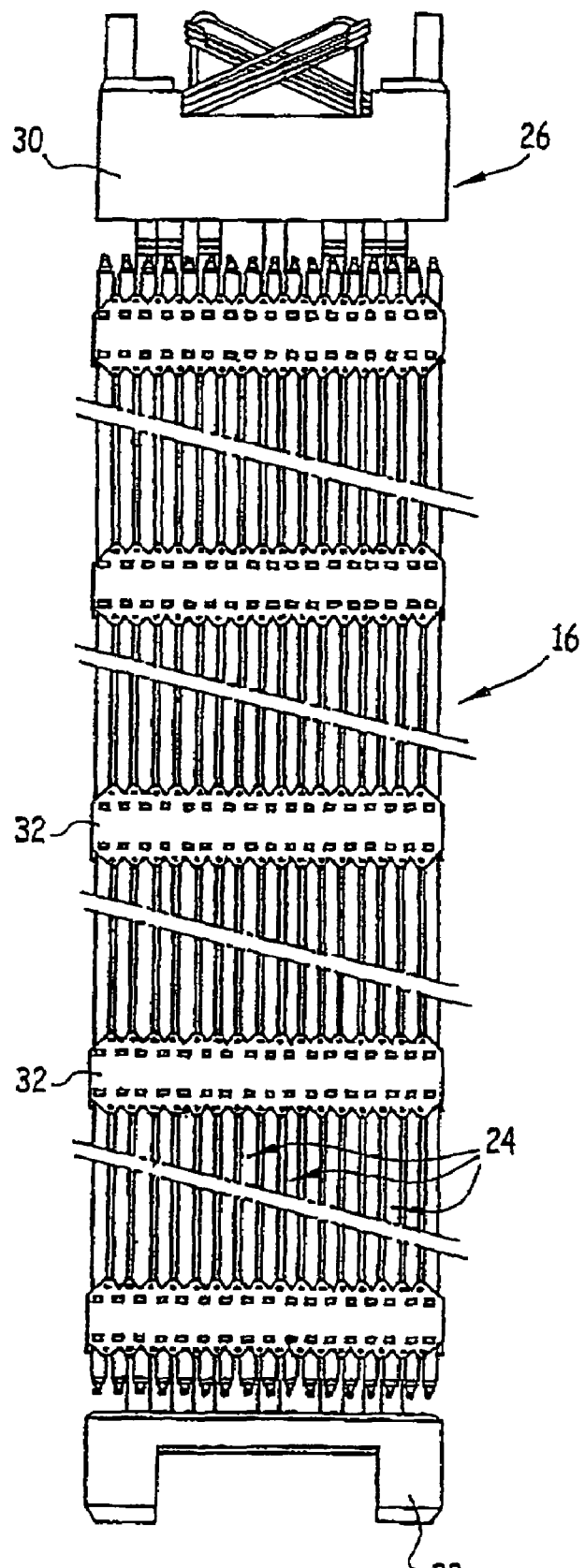
FIG. 2 is a schematic side view of a fuel assembly of the core of the reactor of FIG. 1.

As illustrated in FIG. 2, each fuel assembly 16 conventionally comprises a network of fuel rods 24 and a skeleton 26 for supporting the rods 24.

The skeleton 26 conventionally comprises a lower connecting piece 28, an upper connecting piece 30, guide tubes, which connect the two connecting pieces 26 and 28 and which are intended to receive control rods of the clusters 20, and spacer grids 32.

Figure 3:
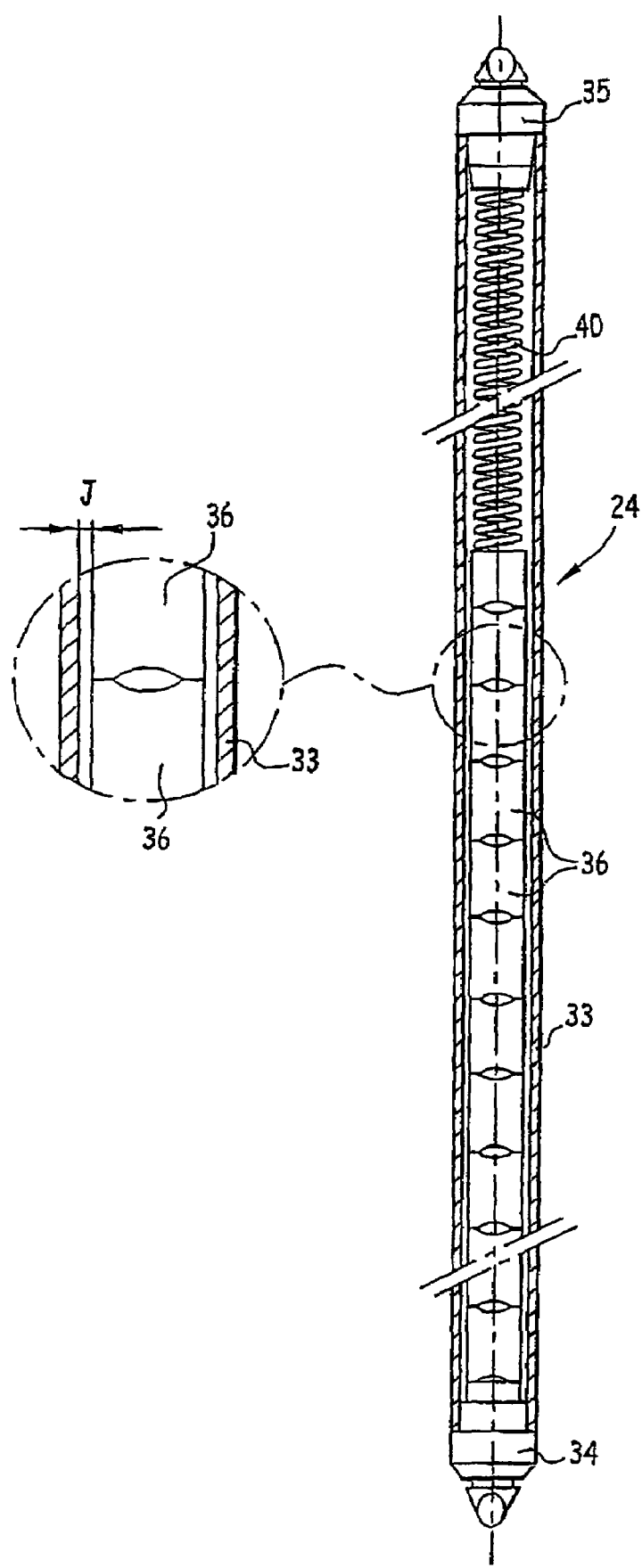
FIG. 3 is a schematic longitudinal section through a fuel rod of the assembly of FIG. 2.

As illustrated in FIG. 3, each fuel rod 24 conventionally comprises a cladding 33 in the form of a tube which is closed at the lower end thereof by a lower closure 34 and at the upper end thereof by an upper closure 35. The rod 24 comprises a series of pellets 36 which are stacked in the cladding 33 and which rest against the lower closure 34. A holding spring 40 is arranged in the upper portion of the cladding 33 in order to rest against the upper closure 35 and the upper pellet 36.

The pellets 36 are of uranium oxide and the cladding 33 is of zirconium alloy.

In FIG. 3, which corresponds to a fuel rod 24 which is in the state after production and before irradiation, there is radial play J between the pellets 36 and the cladding 33. This is illustrated in greater detail by the enlarged, circled part of FIG. 3.

When the reactor 1 is to operate, for example, at its nominal total power PN, the nuclear fuel of the pellets 36 will be, in accordance with the term used in the art, conditioned.

The conditioning is substantially characterized by the closure of the play J between the pellets 36 and the cladding 33 owing to the creep of the cladding 33 and the swelling of the pellets 36.

More specifically, it is possible to set out the following steps for each pellet 36:

1) Under the effect of the difference in pressure between the exterior (water of the primary circuit 8) and the interior of the rod 24, the cladding 33 is progressively deformed by creeping radially towards the inner side of the rod 24. All things otherwise being equal, the rate of creep of the cladding 33 is a characteristic of the material which constitutes it. Furthermore, the fission products which are retained for the most part in the pellet 36, bring about swelling of the pellet 36. During that phase, the stress of the cladding 33 from the point of view of the loadings is purely the result of the differential pressure which exists between the exterior and the interior of the rod 24. The stresses in the cladding 33 are compression stresses (conventionally negative).

2) Contact between the pellet 36 and the cladding 33 begins at the end of a period of time which substantially depends on the local irradiation conditions (power, neutron flux, temperature . . . ) and the material of the cladding 33. In reality, contact is brought about progressively over a period of time which starts with soft contact followed by strong contact being brought about. The contact pressure of the oxide of the pellet 36 on the inner face of the cladding 33 leads to an inversion of the stresses in the cladding 33, which become positive and tend to urge the cladding in terms of traction.

3) The swelling of the pellet 36 continues and imposes its deformation on the cladding 33 in an outward direction. When a permanent state is established, that expansion is sufficiently slow for the relaxation of the material of the cladding 33 to allow equilibrium of the efforts in the cladding 33. Analysis shows that, under those conditions, the level of stresses in terms of traction is moderate (a few tens of MPa) and does not pose any risk with respect to the integrity of the cladding 33.

Although there is no risk of the cladding 33 failing during a permanent state because of the thermomechanical equilibrium in the cladding 33 at levels of stress which are fairly low, a risk occurs as soon as the power supplied by the rod 24 varies strongly.

An increase in power brings about an increase in the temperature in the rod 24. Given the difference in the mechanical characteristics (thermal expansion coefficient, Young's modulus) and the difference in temperature between the pellet 36 of uranium oxide and the cladding 33 of zirconium alloy, the pellet 36 will expand more than the cladding 33 and impose its deformation on the cladding 33.

Furthermore, the presence of corrosive fission products, such as iodine, in the space between the cladding 33 and the pellet 36 produces the conditions for stress corrosion. As a result, the deformation imposed by the pellet 36 on the cladding 33 during a transient occurrence, or variation, in power may bring about a failure of the cladding 33.

Failure of the cladding 33 is not allowed for safety reasons because it could result in the release of fission products in the primary circuit 8.

Transient power occurrences may be brought about during normal operation of the reactor 1, such as, in situations referred to as category 1. Variations in power can be necessary, in particular in order to adapt to the needs for electrical energy of the network which the generator 5 supplies. Transient power occurrences can also be produced during accident situations, referred to as category 2, such as an excessive increase in load, uncontrolled removal of a group or groups of clusters 20 in use, the dilution of boric acid or undetected dropping of clusters 20.

In order to ensure the integrity of the rods 24 with respect to the interaction of pellets 36 and claddings 33, the invention proposes to establish limit values for operational parameters of the reactor 1, taking into consideration that pellet/cladding interaction.

Figure 4:
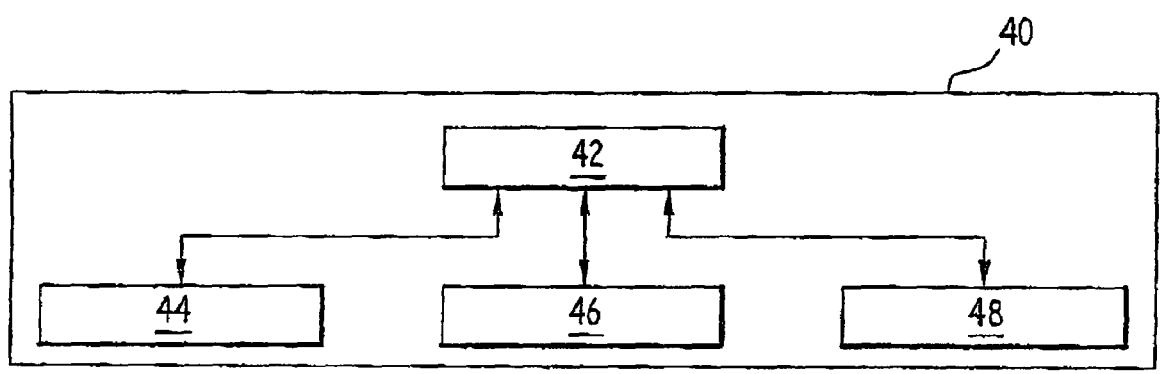
FIG. 4 is a block diagram of a system for establishing limit values for operational parameters of the reactor of FIG. 1.

To that end, it is possible to use, for example, a data-processing system 40 such as that in FIG. 4. That system 40 comprises, for example, an information processing unit 42 which comprises one or more processor(s), a data storage arrangement 44, an input/output arrangement 46 and an optional display arrangement 48.

Figure 5:
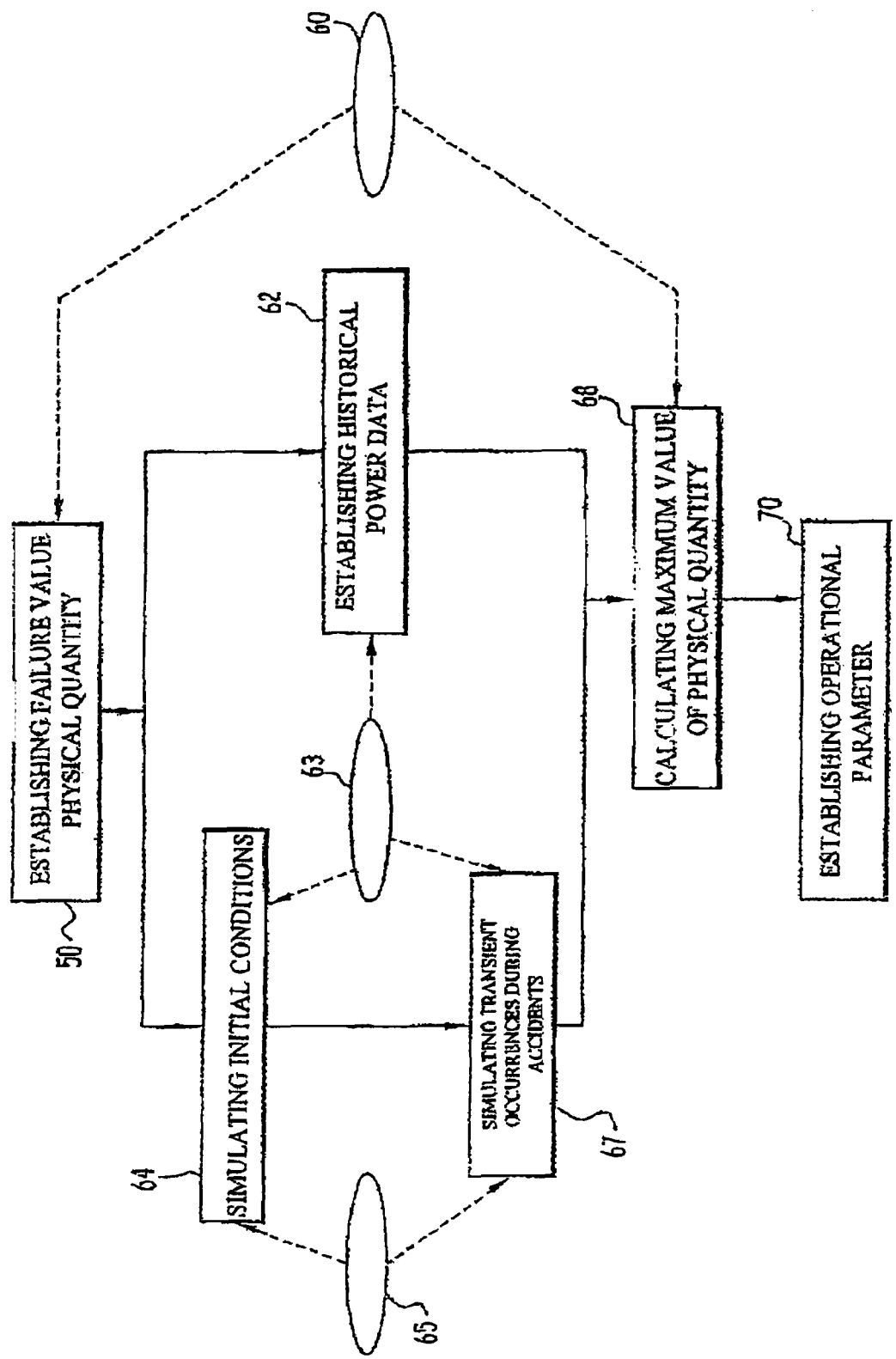
FIG. 5 is a flow chart illustrating successive steps of the method carried out by the system of FIG. 4.

The method for establishing limit values for the operational parameters is illustrated by the flow chart of FIG. 5.

A first step illustrated by the block 50 recites establishing a value of a physical quantity for which a failure of a cladding 33 of a rod 24 occurs in the event of an increase in the nuclear power supplied by the rod 24.

The physical quantity is, for example, the circumferential and normal stress $\sigma_{74}$ in the cladding 33. In other variants, it may be a function of stress(es), for example, the difference between $\sigma_\theta$ and the radial and normal stress $\sigma_r$, or the deformation energy density in the cladding 33.

In order to establish the failure value, it is possible to subject a given number of portions of rods 24 which are, for example, pre-irradiated in power reactors and therefore correspond to various burn-up levels, to gradients or an abrupt increase in power in test reactors.

Figure 6:
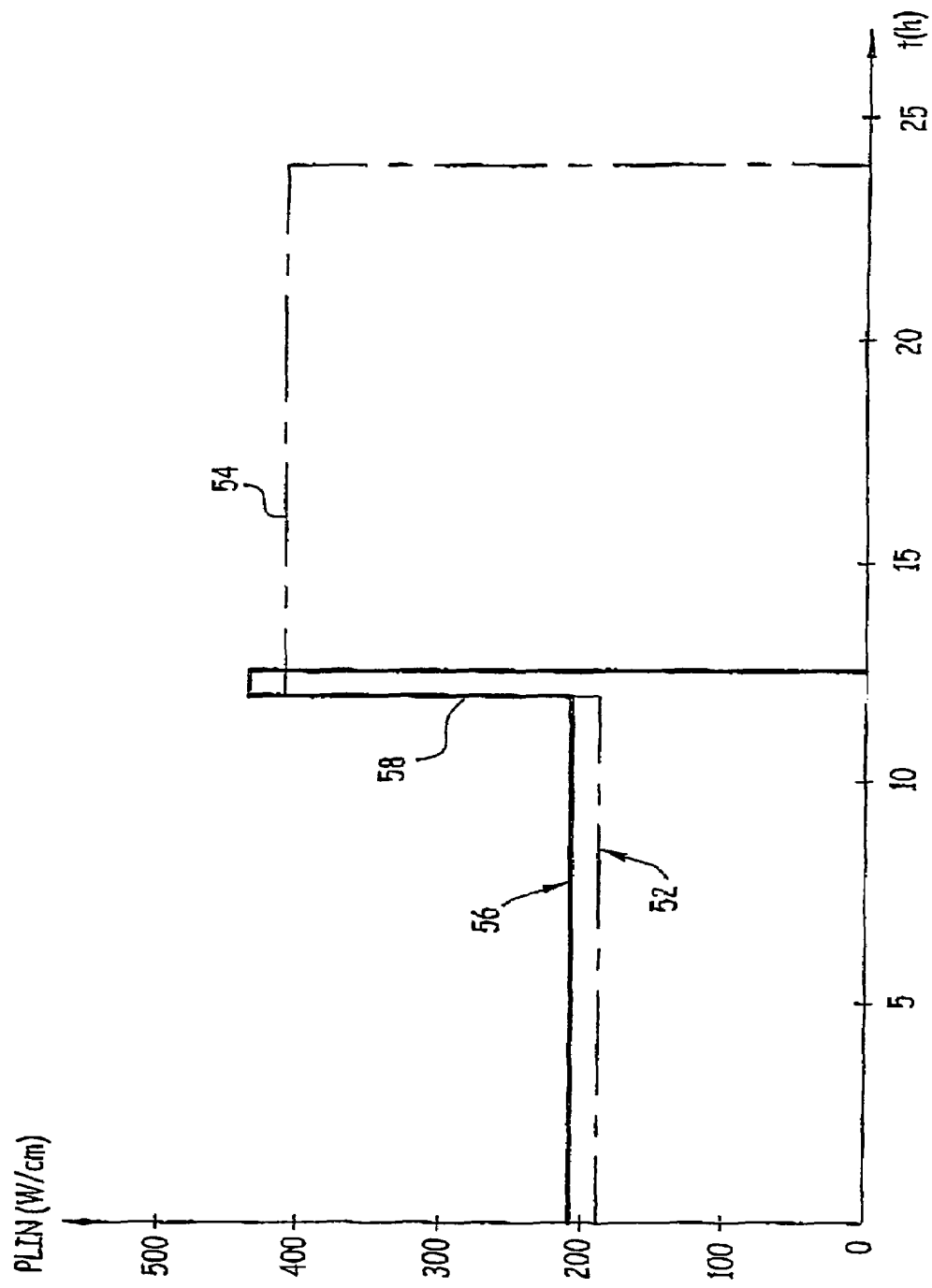
FIG. 6 is a line illustrating power gradient tests carried out on fuel rods.

Gradients of this type are schematically indicated in FIG. 6, in which the power per unit length PLIN supplied by a rod portion 24 is marked on the ordinate and the time is marked on the abscissa.

The dashed line 52 in FIG. 6 illustrates a power gradient to which a rod portion 24 is subjected, during which no failure of the cladding 33 is produced.

The high power supplied by the rod portion 24 at the end of the gradient is illustrated by the portion 54 of the line 52. This high power is maintained for several hours.

The solid line 56 illustrates the case of a rod portion 24 for which a failure of the cladding 33 is produced. In that case, the gradient which is schematically indicated by the portion 58 of the line 56 is interrupted immediately and the power PLIN is brought rapidly to 0.

For each rod portion 24, the maximum value $\sigma_{\theta MAX}$ reached by the physical quantity $\sigma_\theta$ is calculated by software which is designated 60 in FIG. 5 and which is, for example, stored in the storage arrangement 44 of the system 40. Such software 60 may be a conventional piece of software which makes use of the finite elements in order to model the thermomechanical behavior of the rod portion 24.

Figure 7:
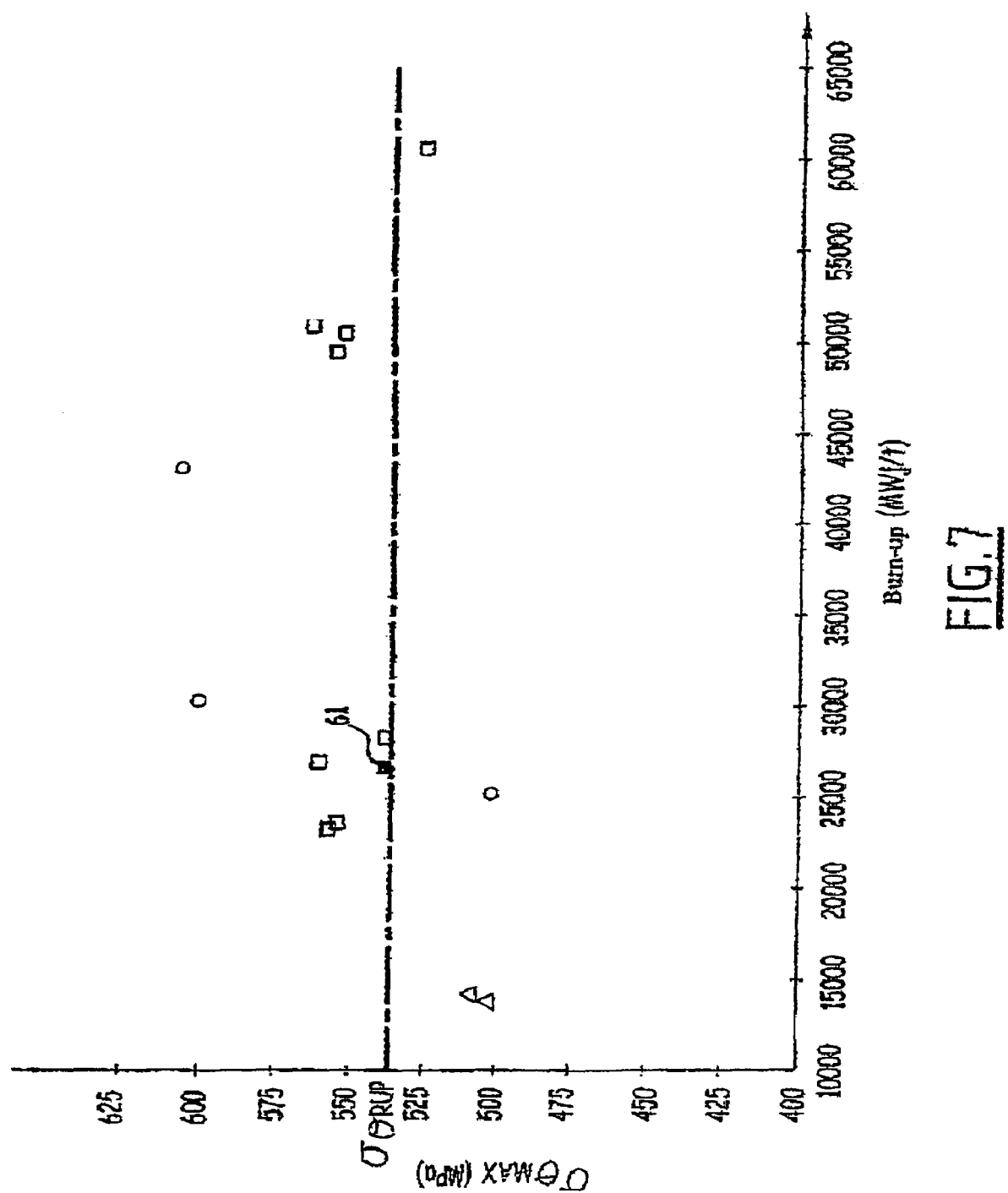
FIG. 7 is a graph illustrating the maximum stresses reached in the claddings of fuel rods during power gradient tests.

FIG. 7 shows the values $\sigma_{74\ MAX}$ calculated in this manner for all of the portions of rods 24 which each correspond to a different level of burn-up. In FIG. 7, the stress is marked on the ordinate and the burn-up on the abscissa. The failure value retained will be less than or equal to the minimum from the values $\sigma_{\theta MAX}$ for which a failure of the cladding 33 has effectively been brought about.

In the example provided in FIG. 7, only one failure has been produced in a rod 24 which is indicated by the solid square 61. Thus, the failure value $\sigma_{\theta RUP}$ retained for the remainder of the method is approximately 535 MPa.

Subsequently, as schematically indicated by the block 62 in FIG. 5, the historical power data are produced for each rod 24 present in the core 2.

The local thermomechanical state of a rod 24 depends on those historical data. Therefore, it may be advantageous to know the historical data of the power supplied by each rod 24 since its introduction into the core 2 up to the time of an accident which is to be simulated.

Those historical data can be established with software for modeling the neutron behavior of the rods 24, which software is designated 63 in FIG. 5 and stored in the means 44. Such software may be a conventional piece of software based on the finite elements.

The historical operational data relating to each rod 24 are generated for various operating modes of the core 2, that is to say:

basic operation in which the total power P of the core 2 is equal to its nominal power PN, operation at reduced power with the control clusters 20 introduced in the fuel assemblies 16, operation at reduced power with the control clusters 20 removed from the fuel assemblies 16.

The historical data can be generated taking into consideration various levels of reduced power, for example, 10% PN, 30% PN, 50% PN . . .

The simulation of the initial conditions of a category 2 accident, illustrated by the block 64 in FIG. 5, is carried out by means of the software 63 and, for example, by means of other software 65 for simulating the behavior of the whole of the reactor 1. This may be conventional software, including in particular consideration of the regulations of a system for protecting the reactor 1.

The conditions simulated during step 64 correspond to a so-called category 1 situation.

Figure 8:
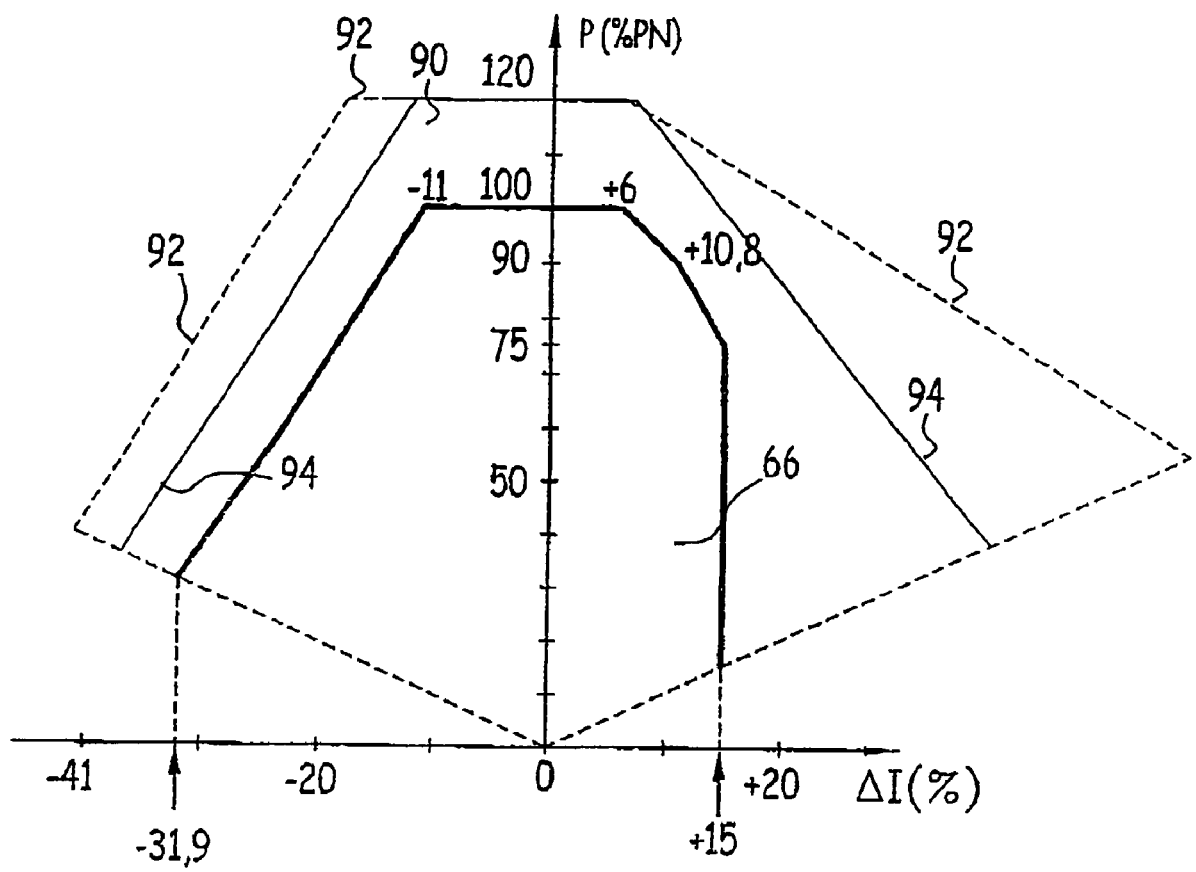
FIG. 8 is a chart representing operational envelopes of the reactor of FIG. 1.

Such a situation is located in envelope 66 of the chart of FIG. 8, in which the percentage of the total power P of the reactor 1 relative to its nominal power PN is marked on the ordinate and the power spacing ΔI between the upper portion and the lower portion of the core is marked on the abscissa.

The initial conditions in the plane P/ΔI are selected so as to maximize the increase in the local power in the event of a transient power occurrence in the core 2.

Those initial conditions are obtained by xenon fluctuations which are produced by instantaneous variations in the total power P of the reactor 2 combined with movements of the control clusters 20, leading to disruptive distributions of power in the core 2.

Thus, the initial conditions can be characterized by:

the rate of burn-up in the rods 24, the total power P supplied by the core 2, the axial distribution of power in the core 2, the axial distribution of xenon, the position of the control clusters 20 and the concentration of boron in the water of the primary circuit 8.

After the step schematically indicated by block 64, transient operational occurrences of the reactor 1 during accidents which bring about abrupt variations in power are simulated, as schematically indicated by the block 67. Those transient occurrences are simulated, for example, by software 63 and 65. The transient occurrences during accidents are simulated from the initial conditions established in step 64, at several moments in each cycle.

The simulated transient occurrences are so-called category 2 transient occurrences during accidents which bring about the greatest and the most rapid variations in power in the core 2.

Those transient occurrences are as follows:

excessive increase in load, uncontrolled removal of groups of control clusters 20 whilst the reactor 1 is in use, cluster(s) 20 falling.

The excessive increase in load corresponds to a rapid increase in the flow rate of steam in the steam generator 3. Such an increase brings about disequilibrium between the thermal power of the core 2 and the load of the steam generator 3.

That disequilibrium leads to cooling of the primary circuit 8. Owing to the moderating effect and/or the control of the mean temperature in the core 2 by the control clusters 20, the reactivity and therefore the nuclear flux increase in the core 2. Thus, the total power P supplied by the core 2 increases rapidly.

In order to simulate that transient occurrence, it is considered that the steam flow rate in the generator 3 increases from its initial value up to the maximum value permitted by the characteristics of the secondary circuit 12. That increase is further sufficiently slow for the power levels studied to prevent the automatic shutdown of the reactor owing to low pressure in the pressurizer 10.

The uncontrolled removal of groups of control clusters 20 while the reactor is operating brings about an uncontrolled increase in the reactivity. This results in a rapid increase in the total nuclear power P and the flux of heat in the core 2. Until a relief valve or a safety valve of the secondary circuit 12 is opened, the extraction of heat in the steam generator 3 increases less rapidly than the power released in the primary circuit 8. This results in an increase in the temperature and the pressure of the water of the primary circuit 8. In order to simulate that transient occurrence, there is assumed a removal of the power groups at the maximum speed of 72 pas/mn up to complete removal.

If one or more of the control clusters 20 drops into the core, an immediate reduction in the reactivity and the total power P in the core 2 results. In the absence of any protective action, the disequilibrium brought about in this manner between the primary circuit 8 and the secondary circuit 12 brings about a decrease in the inlet temperature of the water in the core 2 as well as an increase in the neutron power due to the counter-reactions and the temperature control, until a new equilibrium is reached between the primary circuit 8 and the secondary circuit 12. The presence of the control cluster(s) 20 which have dropped brings about a deformation in the radial power distribution, whereas the removal of the control group leads to an axial modification of the power.

It has been found that other transient power occurrences during accidents did not need to be simulated because they were found to be less disruptive than those cited above. This is particularly the case for a dilution accident.

After the historical power data have been established and the transient occurrences during accidents have been simulated, in step 68 the value of the physical quantity $\sigma_\theta$ reached in the rods 24 during the transient occurrences simulated in step 67 will be calculated. That step 68 uses the results of the steps 62 and 67. In fact, the step 68 will comprise, for each transient occurrence, a first subsidiary step in which the calculation will be carried out roughly for each of the rods 24. That rough calculation can be carried out by means of the software 60.

By way of a variant, the calculation may be carried out only for ⅛ of the rods 24 for reasons of symmetry of the core 2.

Therefore, the rod 24 in which the highest value of the physical quantity $\sigma_\theta$ is reached will be established. Therefore, this will be the rod 24 whose cladding 33 is most stressed, or the limiting rod. By way of a variant, it is possible to select a plurality of limiting rods.

Once the limiting rod 24 has been established in this manner, the maximum value of the physical quantity $\sigma_\theta$ reached in its cladding 33 will be precisely calculated in a second subsidiary step for that single rod 24. That precise calculation can be carried out by the software 60.

Subsequently, as schematically indicated by the block 70, it will be possible to establish, by comparison of the maximum value calculated in step 68 with the failure value $\sigma_{\theta RUP}$ established in step 50, whether a risk of failure of the cladding 33 is encountered during a transient occurrence during accidents.

In this manner, it will be possible to establish, during step 70, the values of operational parameters of the core 2 at the moment of failure of the cladding 33 in the case of simulated transient occurrences during accidents. Those values established will then be the limit values for the operational parameters which a person operating the reactor 1 must comply with.

Such an operational parameter can be, for example, the power per unit length PLIN in the rods 24. The limit value of the parameter established in this manner can be used in order to control the reactor 1 and in particular to establish thresholds for an emergency shutdown or an alarm.

The emergency shutdown threshold may be, for example, equal to the PLIN value established during step 70 and the alarm thresholds correspond to that limit value reduced, for example, by a given percentage.

In specific embodiments of the method, the following operating modes of the reactor 1 are taken into consideration during steps 64 and 67:

basic operation, with the reactor 1 operating at its nominal total power PN, extended operation at intermediate total power PI, reversion to basic operation after extended operation at intermediate total power PI, continuous network operation, primary control operation, operation with remote-control.

The simulation of a transient occurrence during accidents during basic operation corresponds, for each rod 24, to the simulation of a power gradient, such as that illustrated in FIG. 6.

Extended operation at intermediate power is defined as being operation of the reactor 1 in a permanent operating state at a total power PI which is less than or equal to approximately 92% of its nominal power PN over a time of more than 8 hours per 24 hour period.

Such operation has the effect of deconditioning the pellets 36 in the rods 24.

If the power decreases locally, a reduction in temperature results in the pellets 36 and in the cladding 33, which leads to a reduction in the thermal expansion of those elements. Each pellet 36 has a greater thermal expansion coefficient than that of the cladding 33 and therefore retrocedes a greater absolute expansion.

That phenomenon is further accentuated in that, for a given local power reduction, the variation in temperature in each pellet 36 is greater than that in the cladding 33.

For the rods 24 in which contact between the cladding 33 and the pellets 36 has not been established, the radial play J increases. With regard to the rods 24 in which the play J was closed, the play J re-opens.

Should the play J re-open, there is creep in terms of compression of the cladding 33 owing to the effect of pressure. This results in an increase in the stress $\sigma_\theta$ in the cladding 33 when the transient occurrence occurs during accidents.

Figure 9:
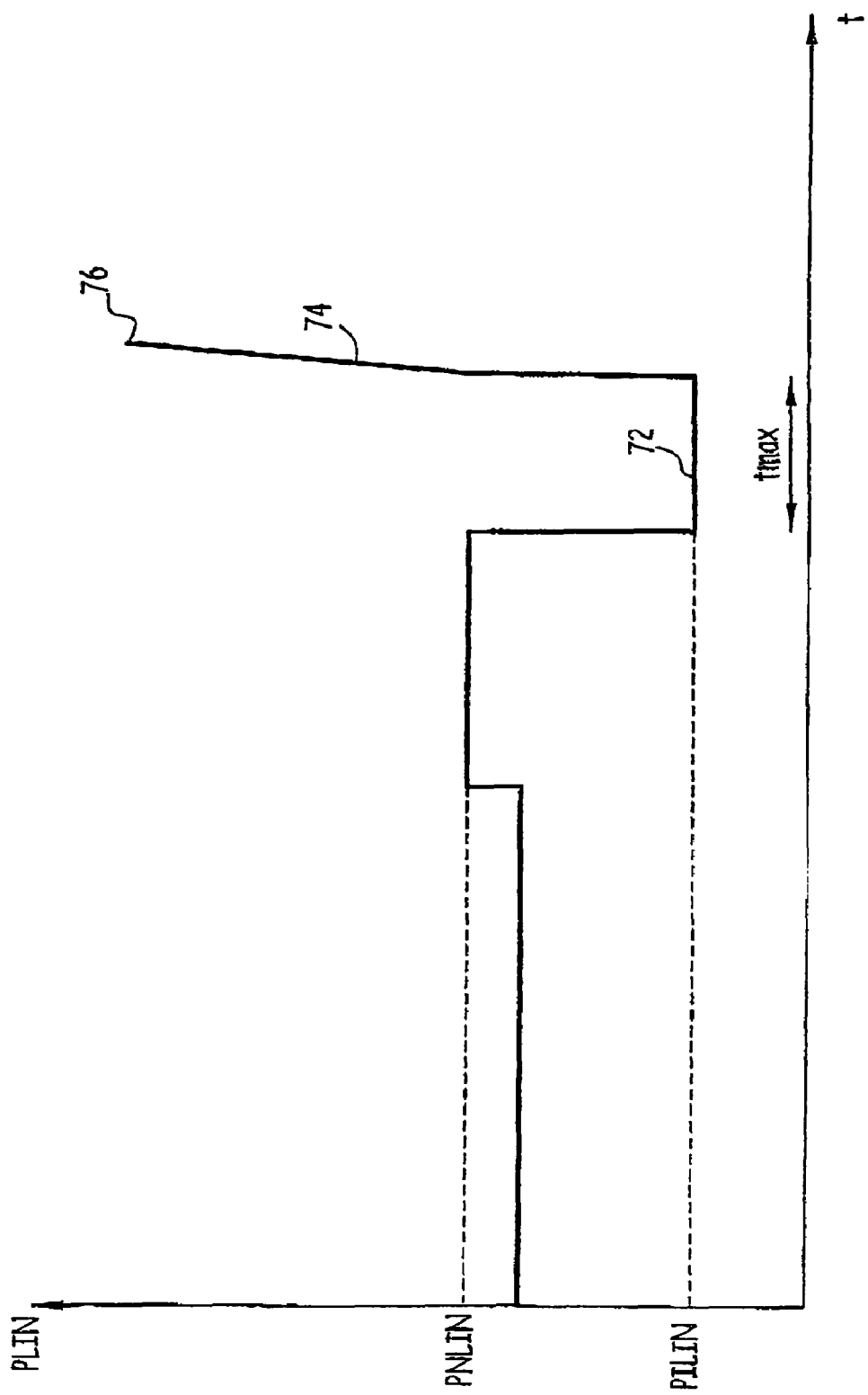
FIG. 9 is a line illustrating the simulation of a transient power occurrence when the reactor of FIG. 1 is being operated for an extended period at intermediate power.

FIG. 9 illustrates, for a rod 24, the simulation of a transient occurrence during accidents during such operation. The power per unit length PLIN in the rod 24 is marked therein on the ordinate and the time t on the abscissa.

The portion 72 of the line corresponds to extended operation at intermediate power. The power per unit length PILIN in the rod 24 is then less than the nominal power per unit length PNLIN which corresponds to the nominal total power PN. The transient occurrence, which corresponds to a power gradient, is schematically indicated by the portion 74 of that same line. That transient occurrence terminates in failure of the cladding 33 at the point 76.

The simulation of extended operation at intermediate power can be carried out for several intermediate power values PILIN in order to cover various situations which may be encountered when the reactor 1 is used.

Furthermore, this simulation can be performed in order to establish the maximum permitted duration tmax of that operating mode so that the transient occurrence 74 following the stage 72 does not cause a failure of the cladding 33.

To that end, stages 72 of increasing duration are simulated until the failure value of the physical quantity selected is reached. The time tmax is the duration of the stage 72 for which the failure value is reached.

It is advantageous to study reversion to basic operation after extended operation at intermediate power with regard to the interactions of pellets/claddings for the following reason.

If the local power increases, there results an increase in the temperatures in the pellets 36 and in the cladding 33 of a rod 24. The thermal expansion coefficient of each pellet 36 being greater than that of the cladding 33, the pellet 36 imposes its deformation on the cladding 33, bringing about relatively high stresses therein. Therefore, reconditioning of the fuel is brought about.

Figure 10:
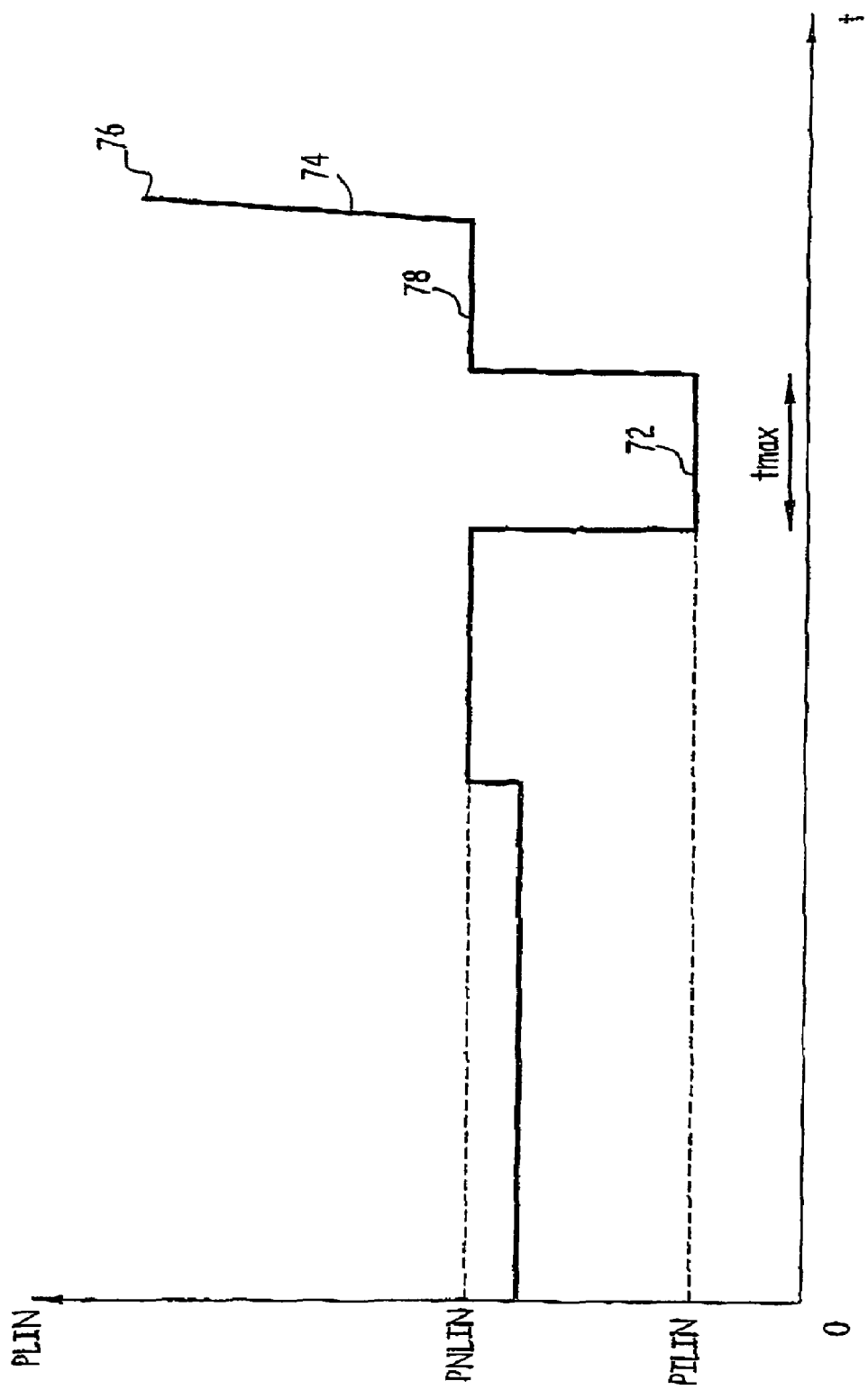
FIG. 10 is a view similar to FIG. 9, the transient occurrence being simulated after extended operation at intermediate power, then reversion to operation at nominal power

Such operation is illustrated by the line in FIG. 10, in which the stage 72 at the power per unit length PILIN is followed by a stage 78 at the nominal value PNLIN.

For the simulation of reversion to basic operation, the stage 72 of FIG. 10 preferably lasts the time tmax.

Continuous network operation is operation in which the reactor 1 operates alternately around a reduced total power PR and in the order of its nominal total power PN. The reduced power can be, for example, approximately 30 or 50% of PN. For example, the operation duration around the reduced power can be 8 hours and that in the order of maximum power PN 16 hours per period of 24 hours. The total power P may vary in each phase around the corresponding reference value PR or PN in order to be adapted to the needs for electrical energy of the network supplied by the generator 5. When the reference value is PN, the variations in power are only negative.

The simulation of the operation in this mode can be performed from basic operation.

In that case, the value calculated previously reduced by a corrective value is used as the failure value. That corrective value can typically be on the order of 20 MPa when the physical quantity in question $\sigma_\theta$ is a stress or a difference in stress levels.

In order to establish the corrective value, it is possible to use the software 60. Transient occurrences during basic operation and transient occurrences during continuous network operation are roughly simulated.

Figure 11:
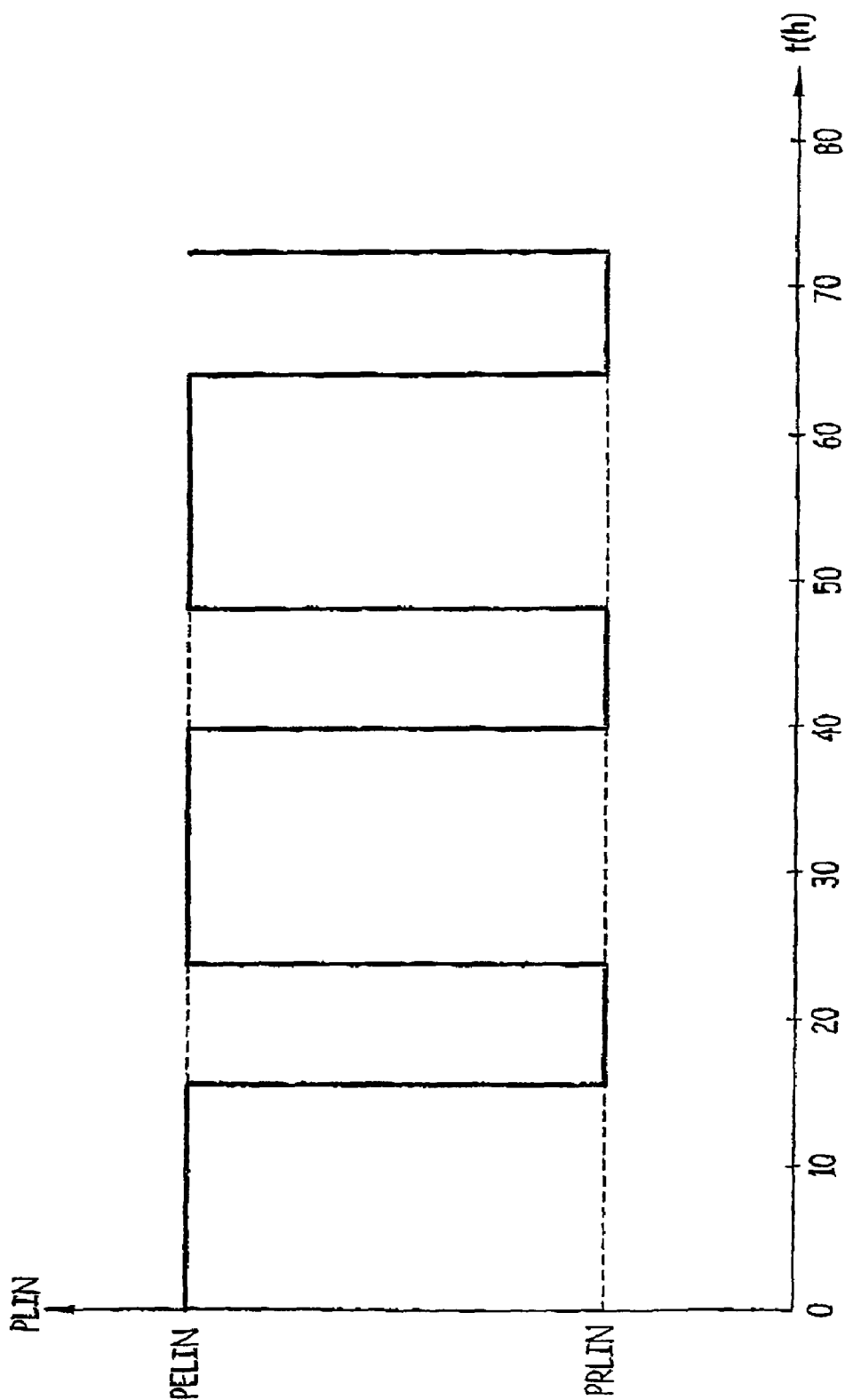
FIG. 11 is a line illustrating the continuous network operation of the reactor.

In order to simplify the calculations, it is possible to model continuous network operation according to the line of FIG. 11, in which the power per unit length PLIN is marked on the ordinate and the time t is marked on the abscissa. Fluctuations around the upper and lower values are not illustrated. In order to take them into consideration, a plurality of simulations are carried out with reduced power levels PRLIN and raised power levels PELIN in the variation envelopes. The difference between the maximum values of $\sigma_\theta$ calculated by the software 60 for the two operating modes then constitutes the corrective value.

In the primary control operating mode, the total power P fluctuates around a reference value on the order of 98% of PN. Variations around that reference value may be in the order of plus 2% and minus 3% of PN.

In remote-control operating mode, the total power P fluctuates around a reference value in the order of 92% of PN. Variations around that reference value may be on the order of plus 8% and minus 7% of PN.

In the same manner as for continuous network operation, primary control operation and remote-control operation can be simulated from basic operation, the value of the physical quantity which characterizes the failure again being affected by a bias.

In that manner, only a single calculation is carried out during basic operation and a corrected failure value is used to take into consideration basic operation, continuous network operation, primary control operation and remote-control operation.

In another embodiment, it is possible to take only basic operation into consideration.

The simulation of the basic operating mode, or the various simulations of the operating modes, can be carried out for each respective configuration of the groups of control clusters 20, at different rates of burn-up of the rods 24.

Thus, for example, there is provided a limit value for the power per unit length PLIN for each configuration of control clusters 20 and by rate of burn-up.

In addition to those limit values which will be used as thresholds for automatically shutting down the reactor 2, the step 70 of FIG. 5 also allows thresholds to be established, from which actions other than the shutdown of the reactor 2 will automatically be triggered. These are, for example, a so-called C4 threshold which corresponds to the threshold values for an emergency shutdown reduced by 3%, and from which values the load of the turbine 4 will automatically be limited.

This may also be an alarm threshold which can be adjusted to the threshold values C4 reduced by 3%.

The method carried out in this manner may result in a limitation of the envelopes of use illustrated in FIG. 8.

In that Figure, the reference numeral 90 indicates the envelope which corresponds to category 2 operational situations. That envelope is located around the envelope 66. The reference numerals 92 indicate boundaries (as dashed lines) of that envelope, as they were established before the method according to the invention was used.

Using the method of the invention leads to some of those boundaries 92 being redefined. The new boundaries 94 are illustrated as solid lines in FIG. 8. As can be seen, the envelope 90 which is redefined based on the method of the invention is therefore narrower. The boundaries 94, which correspond to the thresholds for an emergency shutdown, are therefore more strict than those currently used. Operation of the reactor 1 using the limit parameters which are obtained by the method is therefore safer.

It should be noted that each portion to the right of the boundaries 94 corresponds to pairs of limit values of P and ΔI.

The time tmax established also constitutes a limit value for an operational parameter which is established by means of the method. That value allows an operator to increase the operating time at reduced power and therefore to optimally exploit the capabilities of the reactor 2 by reducing the risks of damage to the rods 24.

In that manner, the method described allows the limit values of operational parameters and the safety procedures to be verified, the limit values for operational parameters of the reactor 1 to be modified, if necessary, and old limits which are too narrow to be converted into a margin for use. Consequently, it is possible to ensure safe operation thereof, whilst optimally exploiting its capabilities.

Step 50 can be carried out separately from the remainder of the method for establishing limit values of operational parameters of the reactor 2.

The various steps of this method can also be carried out by one and the same piece of software stored in the arrangement 44. The principles above can be applied to types of reactor other than pressurized water reactors, for example, boiling water reactors.

The invention claimed is:

1. A method for establishing at least a limit value for at least a first operational parameter of a nuclear reactor having a core, in which fuel assemblies are loaded, the fuel assemblies having fuel rods each comprising pellets of nuclear fuel and a cladding which surrounds the pellets, the method comprising:
   simulating at least a transient operational occurrence of the nuclear reactor;
   calculating a value reached by a physical quantity during the transient operational occurrence in at least one of the fuel rod cladding;
   establishing as the limit value, the value of the first operational parameter when the value calculated for the physical quantity corresponds to a value for the physical quantity which characterizes a failure of the cladding; and
   operating the reactor using the limit value, such that failure of the cladding does not occur.

2. The method according to claim 1, further comprising:
   establishing the failure value for the physical quantity which characterizes a failure of the cladding before the step of simulating at least a transient operational occurrence of the nuclear reactor.

3. The method according to claim 2, wherein the step of establishing the failure value for the physical quantity which characterizes a failure of the cladding comprises
   subjecting the fuel rods to gradients of nuclear power;
   calculating the values reached by the physical quantity in at least the cladding which has failed during a power gradient; and selecting a minimum value from the values reached by the physical quantity.

4. The method according to claim 3, wherein the value which characterizes the failure is equal to the minimum value.

5. The method according to claim 3, wherein the value which characterize the failure is equal to the minimum value and corrected by a factor which represents an operating mode of the reactor.

6. The method according to claim 1, further comprising:
   establishing at least a fuel rod which has a cladding that is the most stressed during the transient occurrence before the step of calculating the value reached by the physical quantity during the transient operational occurrence in at least the fuel rod cladding; and
   wherein the step of calculating a value reached by a physical quantity during the transient operational occurrence in at least the fuel rod cladding is carried out for each rod which is established.

7. The method according to claim 6, wherein the step of establishing at least a fuel rod which has a cladding that is the most stressed during the transient occurrence comprises the subsidiary steps of:
   evaluating the value reached by the physical quantity in the claddings of a plurality of the fuel rods; and
   selecting, as the rod whose cladding is the most stressed, the rod that has a highest value of values determined in the step of evaluating the value reached by the physical quantity in the claddings of a plurality of the fuel rods.

8. The method according to claim 1 wherein the first operational parameter is a power per unit length supplied by a fuel rod.

9. The method according to claim 1, wherein the first operational parameter is a period of time for operation of the reactor at an intermediate power less than its nominal power.

10. The method according to claim 1, wherein the limit value is a limit value for triggering an emergency shutdown of the reactor.

11. The method according to claim 10, further comprising:
establishing a limit value for triggering an alarm from the limit value for an emergency shutdown established in the step of establishing as a limit value, the value of the first operational parameter when the value calculated by the physical quantity corresponds to a value for the physical quantity which characterizes a failure of the cladding.

12. The method according to claim 1, wherein the step of simulating at least a transient operational occurrence is carried out for at least an operating mode of the reactor selected from the group constituted by:
an operating mode at a total power of the reactor equal to the reactors nominal power,
an extended operating mode at intermediate power, in which the total power of the reactor is less than the reactors nominal power over a period of time of at least 8 hours per period of 24 hours,
a continuous network operating mode, in which the total power varies alternatively around a high power and around a low power, and
a primary control operating mode, in which the total power of the reactor varies by from 0 to 5% around a reference value between 95 and 100% of the nominal total power of the reactor.

13. The method according to claim 12, wherein for at least the operating mode, the steps of simulating at least a transient operational occurrence of the nuclear reactor; calculating a value reached by a physical quantity during the transient operational occurrence in at least the fuel rod cladding; and establishing as a limit value, the value of the first operational parameter when the value calculated by the physical quantity corresponds to a value for the physical quantity which characterizes a failure of the cladding, are used for another operating mode with, as the failure value of the physical quantity, the failure value of the other operating mode corrected by a corrective value.

14. The method according to claim 1, wherein the transient occurrence simulated is a transient occurrence of one of:
an excessive increase in load, an uncontrolled removal of at least a group of control clusters or one of the control clusters falling.

15. The method according to claim 1, wherein the physical quantity is one of a stress and a function of stress in the cladding.

16. The method according to claim 1, wherein the physical quantity is a deformation energy density in the cladding.

17. A system for establishing at least a limit value for an operational parameter of a nuclear reactor, comprising:
an arrangement to simulate at least a transient operational occurrence of the nuclear reactor;
an arrangement to calculate a value reached by a physical quantity during the transient operational occurrence in at least a fuel rod cladding;
an arrangement to establish as a limit value, the value of a first operational parameter when the value calculated by the physical quantity corresponds to a value for the physical quantity which characterizes a failure of the cladding; and
an arrangement to operate the reactor using the limit value, such that failure of the cladding does not occur.

18. The system according to claim 17, characterized in that the system comprises at least a computer and a storage arrangement, in which at least a program for carrying out steps of simulating at least a transient operational occurrence of the nuclear reactor, calculating a value reached by a physical quantity during the transient operational occurrence in at least the fuel rod cladding, establishing as a limit value, the value of the first operational parameter when the value calculated by the physical quantity corresponds to a value for the physical quantity which characterizes a failure of the cladding, and operating the reactor using the limit value, such that failure of the cladding does not occur, is stored.

19. A computer-readable medium encoded with executable instructions for establishing at least a limit value for at least a first operational parameter of a nuclear reactor having a core, in which fuel assemblies are loaded, the fuel assemblies having fuel rods each comprising pellets of nuclear fuel and a cladding which surrounds the pellets, the encoded instructions executable by a computer to:
simulate at least a transient operational occurrence of the nuclear reactor;
calculate a value reached by a physical quantity during the transient operational occurrence in at least one of the fuel rod cladding;
establish as the limit value, the value of the first operational parameter when the value calculated for the physical quantity corresponds to a value for the physical quantity which characterizes a failure of the cladding; and
operate the reactor using the limit value, such that failure of the cladding does not occur.

* * * * *